Nov. 4, 1947.   V. G. VAUGHAN   2,430,196

ELECTRIC RANGE HEATING UNIT

Filed Oct. 14, 1943

Victor G. Vaughan,
Inventor.
Haynes and Koenig,
Attorneys.

Patented Nov. 4, 1947

2,430,196

UNITED STATES PATENT OFFICE 2,430,196

ELECTRIC RANGE HEATING UNIT

Victor G. Vaughan, Attleboro, Mass., assignor to Metals and Controls Corporation, Attleboro, Mass., a corporation of Massachusetts Application October 14, 1943, Serial No. 506,123

1 Claim. (Cl. 219—37)

This invention relates to electric range heating units, and with regard to certain more specific features to automatic, thermostatically controlled units of this class, sometimes characterized as automatic electric range burners.

Among the several objects of the invention may be noted the provision of an automatic electric range heating unit or burner which will maintain close control of the temperature of a cooking utensil used therewith, as distinguished from mere temperature control of the electric heating element of the unit; and the provision of apparatus of the class described which will provide proper control regardless of ordinary deformations of the utensil. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claim.

In the accompanying drawings, in which is illustrated one of various possible embodiments of the invention, Fig. 1 is a vertical section showing my invention in use with a typical utensil;

Similar reference characters indicate corresponding parts throughout the several views of the drawing.

Figure 1:
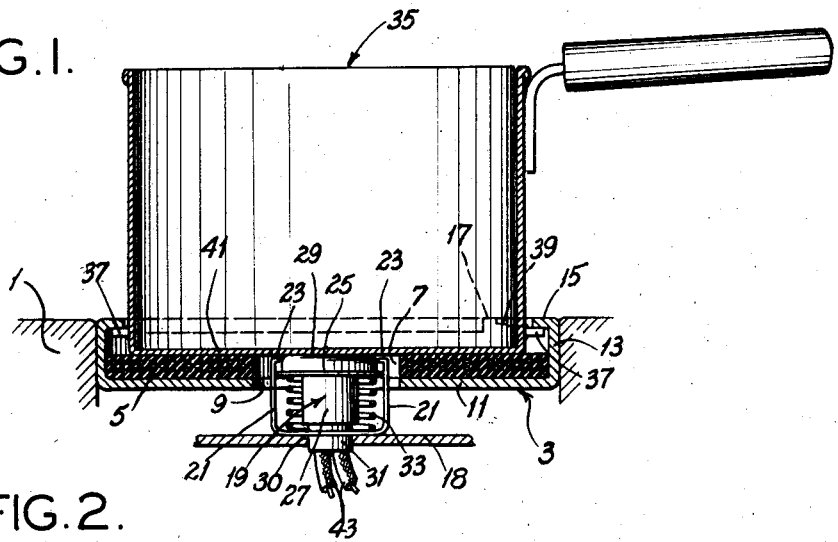

Various attempts have been made to incorporate thermostats in electric burner units for the purpose of regulating the temperatures of the utensils resting thereon. These devices have not been commercially successful because the thermostats have been arranged to respond so much more accurately to heater temperatures than to utensil temperatures that control of the latter suffered. Where thermostatic contacts have been made with the utensils, the results desired have been nullified to a large extent by the fact that utensils with deformed contact points when placed on the burner lost the necessary conductive contact. Thus the desired utensil temperature control was lost.

Referring now more particularly to the drawings, numeral 1 indicates a stove frame which supports a cup-shaped container 3 in which is the usual electrical heating element 5. This element 5 may be wired into the supply circuit sectionally or otherwise, as desired. Thus thermostatic control may be had by cutting in and out the entire heating element or such section or sections as desired. The element 5 is made flat and annular in form providing a flat ring shape with an inner opening 7. A contiguous opening 9 is provided in the flat bottom or base 11 of the container 3. Laterally the container may be made cylindric as indicated at 13 with an upper inwardly turned shoulder 15 in which are bayonet slots 17.

Figure 2:
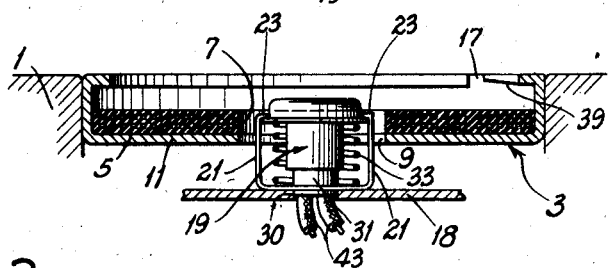
Fig. 2 is a view similar to Fig. 1 but showing the utensil removed.
Figure 3:
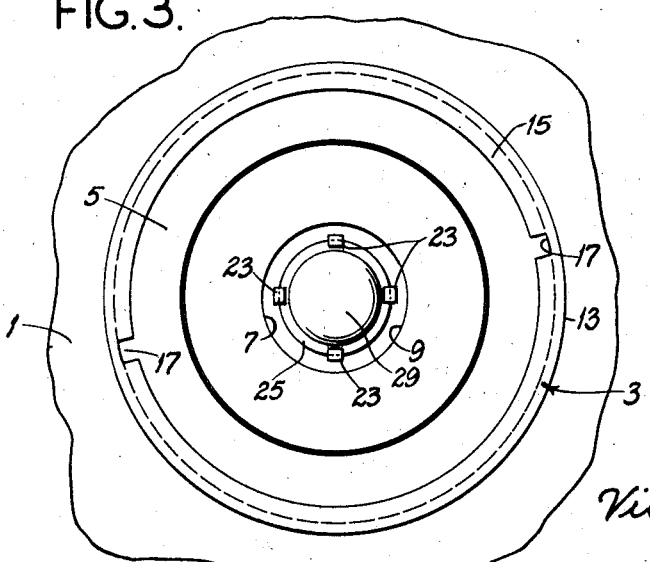
Fig. 3 is a top plan view of Fig. 2.

Beneath the container 3 is a support 18 for a thermostatic unit 19. This unit comprises for example four guides 21 having inwardly turned ends 23 which are engaged by flange 25 of a biased thermostatic switch housing element 27. This element may be variously shaped, the one shown being simply exemplary. As exemplified, element 27 has an upper contact head 29 and a lower cylindric portion 31, the latter sliding in a guide hole 30 through the support 18 and the members 21. A compression spring 33 pressing against the shoulder 25 normally biases the contact head 29 upward to the limiting position shown in Fig. 2. A suitable thermostatically responsive switch is in the housing 27 but is not shown, any of various types being suitable.

Cooperating with the above-mentioned parts is a utensil 35 (cooking utensil, for example) which on the lower sides carries bayonet lugs 37 cooperable with said bayonet slots 17. Upon applying the lugs 37 to the slots 17 and rotating the utensils clockwise sloping portions 39 adjacent to the slots 17 will enforce an advancing movement of the utensil downward. The sloping portions 39 are not always necessary since the weight of the utensil and its contents is often enough to bias the utensil downward.

Upon applying the utensil as above indicated, its bottom 41, regardless of ordinary bottom deformations will sufficiently contact with the upwardly biased head 29 and push it down into some position such as shown in Fig. 1. Thus instead of having a stationary thermostatically responsive unit which may miss contact with a deformed portion of a utensil bottom, there is provided a thermostatic movable contact member which is biased toward engagement with the utensil surface, regardless of any ordinary misshapen character of the latter. For example, ordinary dents in the bottom of the utensil will not prevent sufficient contact.

Flexible lead wires 43 from the thermostatic switch element 19 are wired with the electric heating element 5 and the supply circuit so that when the switch temperature rises above a predetermined value, in response to heating of the utensil, all or part of the heating element 5 is switched out of the circuit. When upon temperature reduction the switch recloses all or a sufficient part of the heating element is again energized to bring up the utensil temperature.

A feature of importance is that the thermostatically responsive unit is substantially thermally free of the heating unit 5, at least so far as the major portion of the high-temperature heat transmission is concerned, namely, the conductive portion. A relatively small proportion of convection and direct radiation may reach the thermostatic element. Thus it is responsive primarily to temperature conditions induced by the important contact conduction from the utensil and not from the electric heating element.

From the above-disclosed principles it will be seen that various means may be used to bias the thermostatic element 19 against the utensil to hold the utensil in place, including gravity. Furthermore, biasing movement may be against other parts of utensils than the bottom, if it is desired to respond to temperatures at other regions of the utensil. For example, a lateral bias may be made against the side of the vessel, the vessel being pushed into lateral contact with the thermostatic unit and suitably interlocked in its then heating position with respect to element 5.

In this specification and attached claim any reference to the thermostatic control switch or element 19 being substantially thermally free of the heating element means that it receives practically no operatively effective amount of heat by direct conduction from the heating element. That is to say 19 is not in substantial direct heat-conductive relation or contact with 5. Substantially all heat conduction to 19 flows through its heat-conductive contact with the utensil. The radiation and convection heat transfer factors between 5 and 19 are small compared to the heat derived by conduction from utensil 35. Insulation material can be placed between 19 and 7 to aid in this result.

It will be understood that although a bayonet interlock is indicated between the electric heating unit and the utensil, other quick-detachable interlocks or latching means may be used.

In view of the above, it will be seen that the several objects of the invention are achieved and other advantageous results attained.

As many changes could be made in the above constructions without departing from the scope of the invention, it is intended that all matter contained in the above description shall be interpreted as illustrative and not in a limiting sense.

I claim:

An electric range heater comprising an annular electrical heating element having a heating surface adapted to receive a cooking utensil, a switch housing containing a thermostatic switch, means guiding said housing for axial movement in the opening of said annular heating element and including stop means for limiting movement of said housing so that it projects above said heating surface in the absence of a cooking utensil, said guide and stop means being thermally isolated from said heating element, spring means biasing said housing toward said stop means, said heating element and switch being connected in a circuit including extensible leads connected to said switch, said housing being engageable by a cooking utensil placed on said heating surface and biased into surface contact therewith so that said switch receives heat by thermal conduction from said utensil only, and is at all times thermally isolated from said heating element, and quick detachable means for interlocking a utensil with said heater and upon said heating surface.

VICTOR G. VAUGHAN.

REFERENCES CITED

The following references are of record in the file of this patent:

UNITED STATES PATENTS

| Number | Name | Date |
| --- | --- | --- |
| 910,479 | Andrews | Jan. 19, 1909 |
| 2,288,510 | Brannon | June 30, 1942 |
| 2,140,479 | Myers et al. | Dec. 13, 1938 |
| 2,303,012 | Weber et al. | Nov. 24, 1942 |